United States Patent [19]
Aubert et al.

[11] 3,932,214
[45] Jan. 13, 1976

[54] NUCLEAR REACTOR

[75] Inventors: Michel Aubert, Pierrevert; Henri Jacques Gollion, Aix-en-Provence; Philippe Verriere, Jouques, all of France

[73] Assignee: Commissariat a l'Energie Atomique, Paris, France

[22] Filed: July 19, 1973

[21] Appl. No.: 380,678

[30] Foreign Application Priority Data
Aug. 8, 1972 France .............................. 72.28573

[52] U.S. Cl. ...................................... 176/65; 176/87
[51] Int. Cl.² .......................................... G21C 15/00
[58] Field of Search ..................... 176/65, 64, 50, 87

[56] References Cited
UNITED STATES PATENTS

| | | | |
|---|---|---|---|
| 3,498,880 | 3/1970 | Gollion | 176/65 |
| 3,784,443 | 1/1974 | Vercasson | 176/64 |

FOREIGN PATENTS OR APPLICATIONS

| | | | |
|---|---|---|---|
| 488,203 | 5/1970 | Switzerland | 176/65 |

*Primary Examiner*—Verlin R. Pendegrass
*Assistant Examiner*—C. T. Jordan
*Attorney, Agent, or Firm*—Cameron, Kerkam, Sutton, Stowell & Stowell

[57] ABSTRACT

A nuclear reactor, especially a sodium-cooled fast reactor in which the coolant is confined at least partially within a vertical primary tank containing the reactor core and surrounded by a main tank containing vertical heat exchangers and pumps for heat removal and continuous circulation of coolant from one tank to the other. Each heat exchanger is provided with inlet and outlet windows respectively at the upper and lower end for the admission and discharge of coolant derived from the primary tank and is surrounded by an outer shell which penetrates together with the heat exchanger into the region located between the primary tank and the main tank.

The outer shell delimits with the heat exchanger an annular space which is joined at the level of the inlet windows to one end of at least one elbowed duct, the other end of which extends into the coolant within the primary tank. The annular space is connected to a pump for producing a variable negative pressure within said space and thus priming the siphon formed by the primary tank, the elbowed duct and the annular space.

4 Claims, 1 Drawing Figure

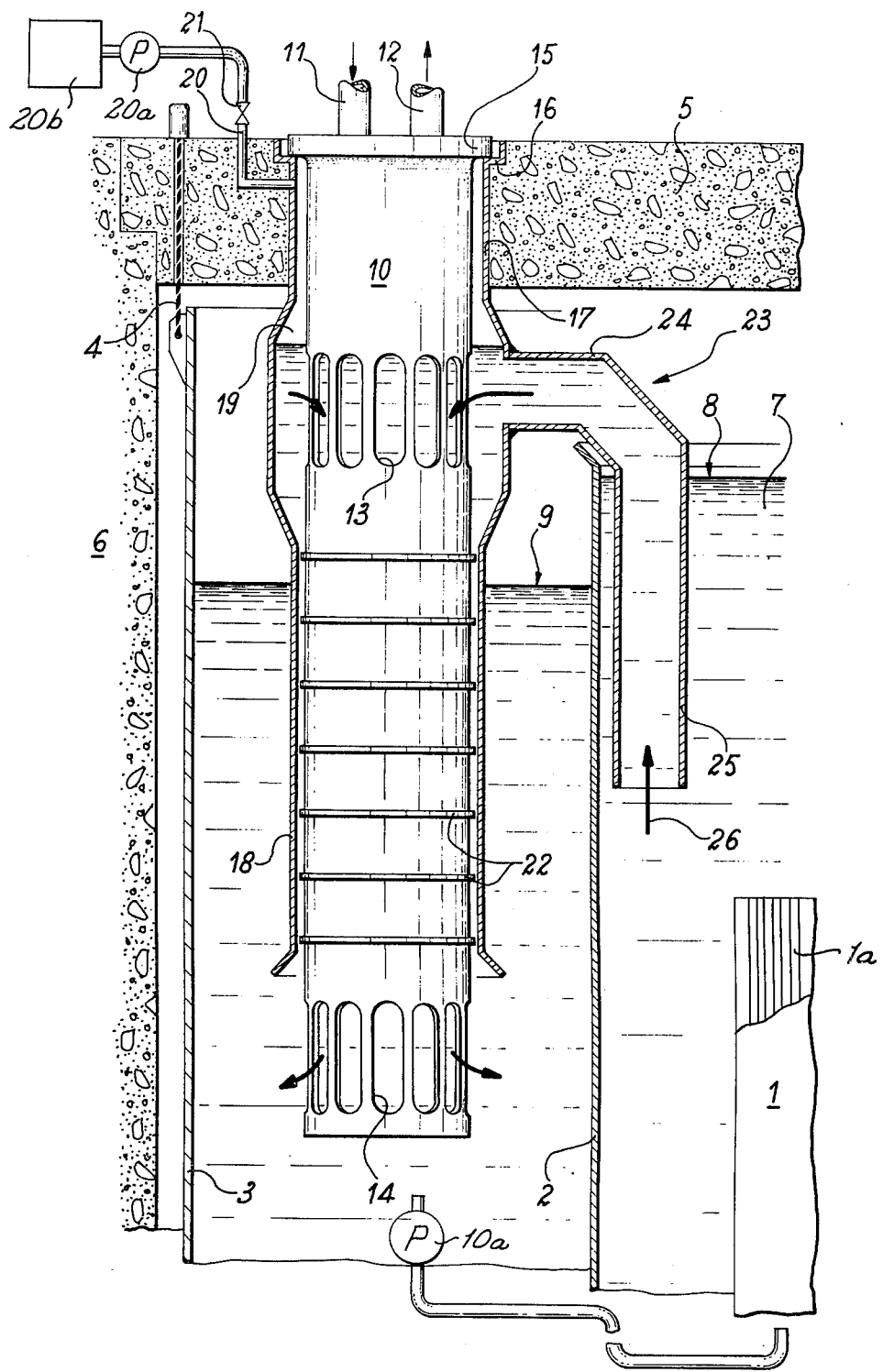

NUCLEAR REACTOR

This invention relates to a nuclear reactor, especially a so-called "fast reactor," in which the core is formed by a group of fuel assemblies and cooled by a liquid metal usually consisting of sodium and circulated in contact with said fuel assemblies. The coolant is confined at least partially within a first tank or so-called primary tank having a vertical axis and containing the reactor core, said primary tank being in turn surrounded by a second tank or so-called main tank. The complete assembly formed by both tanks is placed within a thick-walled structure which constitutes an external containment vessel for providing biological protection against the effects of radioactive radiation.

In one arrangement of this type which is conventional in the technical field under consideration, the invention relates more especially to integrated reactors, that is to say in which the tanks contain not only the reactor core and the volume of sodium which is necessary for cooling this latter but also the reactor auxiliaries and equipment units such as heat exchangers and pumps which serve to ensure removal of the heat picked up by the sodium as it passes through the reactor core and the continuous circulation of this latter from one tank to the other.

In a general manner and when the sodium is circulated in the upward direction through the reactor core, the primary tank or inner tank delimits above the core a region in which the hot sodium collects after being discharged from the core and which must be as well-confined as possible for various reasons of operational safety. As a result of this confinement, however, zones constituted by sodium at different temperatures are present at the level of said tank; this has a tendency to develop differential expansions between the primary tank and other parts of the reactor which are heated to a lower temperature. The heat exchangers mounted within the main tank and outside the primary tank are directly supplied with hot sodium, the cooled sodium which is discharged from said heat exchangers being taken from the main tank, then returned by the circulating pumps beneath the reactor core where the cycle starts again.

The aim of the present invention is to simplify the design concept of the arrangements provided for conveying the hot sodium from the primary tank to the heat exchangers contained in the main tank while retaining in particular both the integrity and the shape of said tanks and especially the primary tank without entailing any need in particular to make provision for penetrations or orifices through the primary tank wall for the discharge of sodium. The connection with the heat exchangers is established in such a manner as to readily permit the further possibility of relative displacements of the heat exchangers with respect to the primary tank as a result of differential expansions caused by the variable temperatures inevitably encountered.

To this end, the nuclear reactor under consideration is so designed that each heat exchanger is mounted with a vertical axis, is provided with inlet and outlet windows respectively at the upper and lower end for the admission and discharge of sodium derived from the primary tank and is surrounded by an outer shell which penetrates together with the heat exchanger into the region located between the primary tank and the main tank. The reactor is characterized in that the outer shell delimits with the heat exchanger an annular space joined at the level of the heat-exchanger inlet windows to one end of at least one elbowed duct, the other end of which extends into the sodium contained in the primary tank. Said annular space is connected by means of a pipe providing a communication with a pumping source for producing a variable negative pressure within said space and thus priming the siphon formed by the primary tank, the elbowed duct and the annular space.

Apart from this main feature, a nuclear reactor which is constructed in accordance with the invention has further related features which are preferably intended to be employed in combination but could in some cases be considered separately and relate in particular to the following points:

each heat exchanger is provided in the external surface thereof between the sodium inlet and outlet windows with projecting annular flanges which delimit with the opposite wall of the outer shell a labyrinth seal for the annular space;

the outer shell which surrounds each heat exchanger is extended at the top portion thereof by a tubular element which passes through the biological shield structure and is provided with an annular bearing shoulder for supporting the heat exchanger;

the pipe which opens into the annular space can be connected with a source of gas under pressure for the controlled unpriming of the siphon.

Further characteristic features of a nuclear reactor which is constructed in accordance with the invention will now become apparent from the following description of one exemplified embodiment which is given by way of indication but not in any limiting sense, reference being made to the single FIGURE of the accompanying drawing which is a diagrammatic view of said reactor in partial vertical cross-section.

In this FIGURE, the reference numeral 1 designates diagrammatically a fast reactor core formed by the side-by-side arrangement of fuel assemblies 1a containing either fertile or fissile material. The reactor core 1 has a vertical axis and is disposed within a first tank 2 or so-called primary tank which is in turn surrounded by a second tank 3 known as the main tank and placed in coaxial relation with the first, both tanks being open at the top. In a manner known per se, the tank 3 can be suspended by means of the type designated by the reference 4 from a slab 5 of substantial thickness forming a top closure for a biological shield structure or vessel containing the complete installation. Said tanks 2 and 3 are filled with a suitable volume of liquid metal and especially sodium which serves to cool the reactor core 1 during operation and to transfer the heat picked-up in contact with the fuel assemblies to a secondary fluid employed in the production of electric power outside the reactor.

The foregoing arrangements make it possible in particular to confine the hot sodium which is discharged from the reactor core 1 after having passed upwardly through this latter within the tank 2. The sodium which remains and especially which is contained within the tank 3 is at a lower temperature, especially as a result of the cooling action produced through the heat exchangers of the type shown at 10 in the drawing. These heat exchangers are preferably mounted at uniform intervals within the main tank 3 outside the primary tank 2 and associated with circulating pumps 10a which are also mounted within the tank 3 and serve to take the sodium from the outlets of the heat exchangers and to return it beneath the reactor core 1 for a further passage through this latter. As a result of the output of said pumps and the pressure drops encountered, the levels of sodium respectively within the tanks 2 and 3 as shown in the FIGURE at 8 and 9 are such that the level 8 in the tank 2 is slightly higher than the level 9 in the tank 3.

Each heat exchanger 10 is designed in the form of a unit having a vertical axis and a generally cylindrical shape. Pipes 11 and 12 for the admission and discharge of a suitable secondary fluid which can be either sodium or water penetrate into the upper end of each heat-exchanger unit. The secondary fluid passes through the heat exchanger through a series of circulation tubes (not shown in the drawing) which are maintained parallel to the axis of the unit by means of tube-plates. The heat-exchanger unit 10 is provided at the upper and lower ends with inlet and outlet windows for the admission and discharge of the sodium which is present within the tanks 2 and 3 and which is accordingly permitted to come into contact with the secondary-fluid circulation tubes. The sodium passes downwardly through the heat exchanger so as to be recirculated at the outlet of this latter by the pumps mentioned above and returned towards the reactor core 1. The heat exchanger 10 is provided at the top end with a transverse annular flange 15 which rests on an annular bearing shoulder 16 forming part of an element 17. Said element forms a linear tube which extends through the top slab 5 of the containment vessel 6 and serves to support said heat exchanger which can thus extend directly into the volume of sodium contained between the tanks 2 and 3.

In accordance with the invention, the liner tube 17 is extended downwards in the form of a cylindrical shell 18 which surrounds the heat exchanger and delimits with this latter an annular space 19 which is joined by means of a connector-pipe 20 fitted with a regulating valve 21 to a pumping source 20a which is located outside the reactor and serves to reduce the pressure within said annular space with respect to the pressure of an inert blanket gas from source 20b which is maintained above the sodium within the tanks 2 and 3. The heat exchanger 10 is provided in the external surface thereof with a series of annular flanges 22 which form radial projections towards the opposite wall of the shell 18, these annular flanges being intended to form with said wall a labyrinth seal for maintaining at least partial leak-tightness of the annular space 19. At the top portion of the shell 18 and substantially at the level of the inlet windows 13, a communication is provided between said space 19 and the primary tank 2 by means of an elbowed duct 23, the lower end of which extends beneath the level 8 of the sodium within said primary tank. Said duct 23 has in particular a horizontal portion 24 and a vertical 25 which is immersed in the sodium to a level which is determined by the operating conditions of the installation and in particular by the rate of flow through the heat exchanger 10 and the reactor core 1.

The operation of the fast reactor under consideration is accordingly as follows: under the action of the circulating pumps, the sodium which is collected in the main tank at the outlets of the heat exchangers 10 is discharged through collectors (not shown) beneath the reactor core 1 into the tank 2, the sodium being then passed upwardly through the reactor core in contact with the fuel assemblies. Under these conditions, the hot sodium discharged from the reactor core is confined within the primary tank 2. In order to ensure transfer of the sodium to the main tank 3, the annular space 19 is subjected to a suitable degree of negative pressure by means of the pipe 20, said negative pressure being produced in a progressive manner and limited to a low value of one tenth of an atmosphere, for example. The level of sodium rises simultaneously within the duct 23 in the direction of the arrow 26 and around the bundle of secondary-fluid circulation tubes within each heat-exchanger unit 10. When this level reaches the bottom generating-line of the horizontal portion 24 of the duct 23, the flow begins to take place from the primary tank 2 towards the main tank 3 and the hot sodium penetrates through the inlet windows 13. As the level of sodium continues to rise, said windows 13 are then entirely covered, the heat exchanger then operates continuously and the duct 23 performs the function of a conventional siphon As an advantageous feature, the inlet windows 13 are so designed and arranged as to produce a slight turbulence within the sodium flow in order to ensure the necessary stability of operation. In fact, if the flow were to take place without turbulences, the sodium derived from the primary tank 2 would also pass a small quantity of neutral gas which is present above the level 8 within said tank; by progressively accumulating within the annular space 19, this quantity of gas would be liable to produce a pressure rise and correlatively a reduction in the level of sodium with respect to the windows until final unpriming of the siphon. On the other hand, by generating a suitable turbulence, this gas is carried along with the sodium which passes through the heat exchanger, the negative pressure within the annular space 19 being consequently maintained at a substantially constant value.

In the nuclear reactor which is thus constructed, it is possible not only to ensure confinement of the hot sodium within the primary tank but also, by virtue of the arrangement which is contemplated, to obtain either a reduction in the volume of hot sodium contained in the reactor or alternatively an increase in the height of the heat-exchangers for a given volume.

A further advantage of the arrangement considered arises from the possibility of isolating one or a number of heat exchangers at will, simply by regulating the pressure within the annular space. Thus, by injecting into said space a suitable quantity of neutral gas such as argon under pressure, the effect thereby achieved is to lower the level of sodium within said space and to cause immediate unpriming of the corresponding siphon. Strictly speaking, it is only necessary to ensure that the volume flow rate of injected gas is equal to the rate of flow of sodium through the heat exchanger or in other words that the quantity of gas is equal to the volume represented by the complete heat-exchanger unit and shell.

A further advantage also arises from the assembly of each heat exchanger within a cylindrical shell which extends through the top slab of the containment vessel structure and permits of relative displacements of said heat exchanger and of the two tanks without any mutual reactions of these different elements, irrespective of the differential expansions which may take place. Finally, the use of a connecting duct between the annular space provided around each heat exchanger and the primary tank avoids the need to modify the shape of said tank and accordingly makes it possible to maintain the integrity of this latter, especially by dispensing with any need for holes or other penetrations through the wall of said tank for the flow of sodium.

It must be clearly understood that the invention is not limited to the exemplified embodiment which has been more especially described with reference to the drawings but extends to all alternative forms. From this it follows that the labyrinth seal which is intended to ensure leak-tightness of the annular space 19 could be formed by means other than that described in the foregoing by way of example and by making use of another type of mechanical seal (which can be secured to the heat exchanger 10 or to the shell 18) or alternatively a hydraulic seal.

What we claim is:

1. A nuclear reactor and especially a fast reactor having a core formed by a group of fuel assemblies and cooled by a liquid metal usually consisting of sodium and circulated in contact with said fuel assemblies, said coolant being confined at least partially within a first primary tank having a vertical axis and containing the reactor core, said primary tank being in turn surrounded by a second main tank, the complete assembly formed by both tanks being placed within a thick-walled structure which constitutes an external containment vessel for providing biological protection against the effects of radioactive radiation, the main tank containing heat exchangers and pumps for removal of heat picked up by the sodium as it passes through the reactor core and circulating said sodium in continuous flow from one tank to the other, each heat exchanger being mounted with a vertical axis, provided with inlet and outlet windows respectively at the upper and lower end for the admission and discharge of sodium derived from the primary tank, and surrounded by an outer shell which penetrates together with said heat exchanger into the region located between the primary tank and the main tank, wherein said shell delimits with the heat exchanger an annular space joined at the level of the heat-exchanger inlet windows to one end of at least one elbowed duct, the other end of which extends into the sodium contained in the primary tank, said annular space being connected by means of a pipe providing a communication with a pumping source for producing a variable negative pressure within said space and thus priming the siphon formed by said primary tank, said elbowed duct and said annular space.

2. A nuclear reactor according to claim 1, wherein each heat exchanger is provided in the external surface thereof between the sodium inlet and outlet windows with projecting annular flanges which delimit with the opposite wall of the outer shell a labyrinth seal for the annular space.

3. A nuclear reactor according to claim 1, wherein the outer shell which surrounds each heat exchanger is extended at the top portion thereof by a tubular element which passes through the biological shield structure and is provided with an annular bearing shoulder for supporting said heat exchanger.

4. A nuclear reactor according to claim 1, wherein the pipe which opens into the annular space is connected with a source of gas under pressure for the controlled unpriming of the siphon.

* * * * *